*Case A.*
Charles William Siemens' Invention having reference to air and gas regenerators and furnaces for metallurgical operations, such as the smelting of ores, puddling and heating Iron &c.
Sheet 1.
109064
PATENTED Nov 8 1870
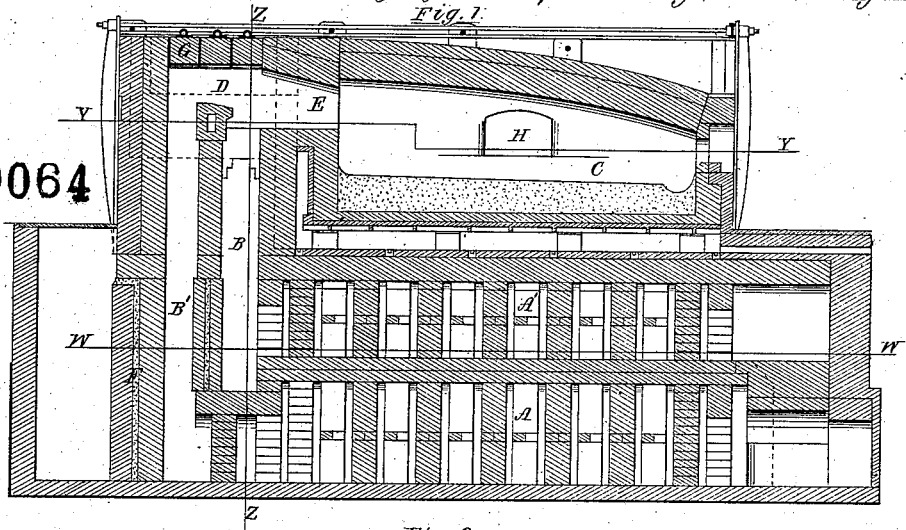
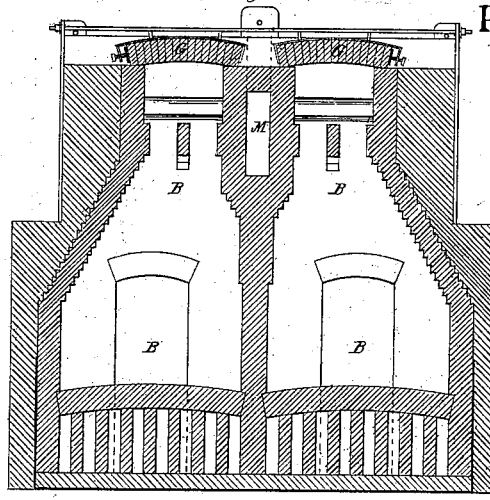
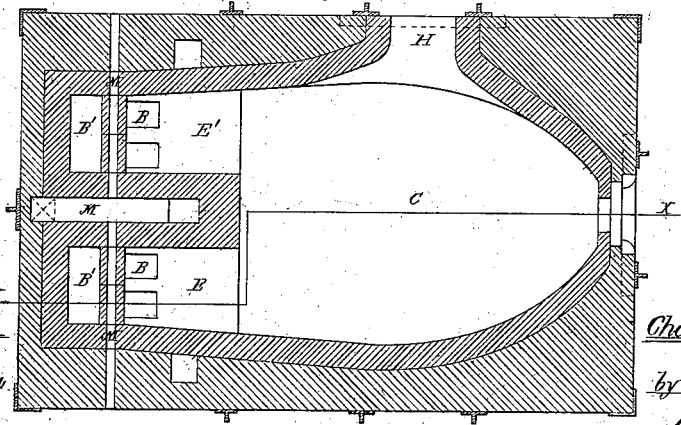
Witnesses
S. N. Piper
L. N. Miller
Charles W. Siemens.
by his attorney
R. H. Eddy Case A. Sheet 2.
*Charles William Siemens' Invention having reference to air and gas regenerators and furnaces for metallurgical operations, such as the smelting of ores, puddling and heating Iron, &c.*
Fig. 4.
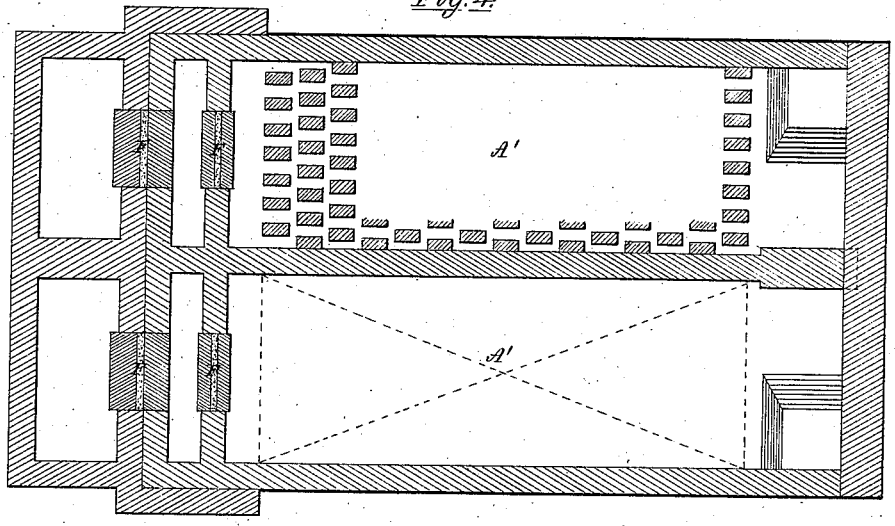
Section at A.B.
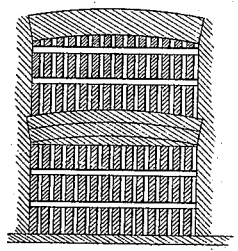
Fig. 5. Section at C.D.
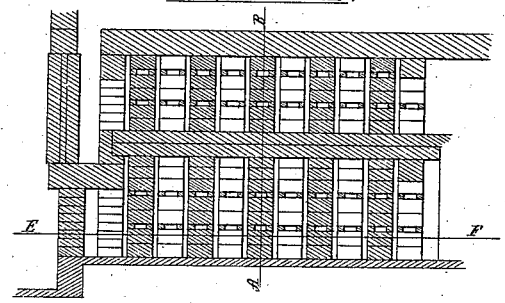
Section at E.F.
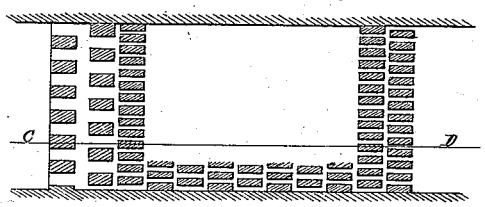
Witnesses
S. N. Piper
L. N. Möller
Charles W. Siemens.
by his attorney
R. H. Eddy

United States Patent Office.

CHARLES WILLIAM SIEMENS, OF WESTMINSTER, ENGLAND.

Letters Patent No. 109,064, dated November 8, 1870.

IMPROVEMENT IN METALLURGIC GAS-FURNACES.

The Schedule referred to in these Letters Patent and making part of the same.

*To all persons to whom these presents may come:*

Be it known that I, CHARLES WILLIAM SIEMENS, of Westminster, of the county of Middlesex, England, have made a new and useful invention, having reference to Air and Gas-regenerators and Furnaces for Metallurgical Operations, such as the smelting of ores, puddling, and heating iron, &c.; and I do hereby declare the same to be fully described in the following specification and represented in the accompanying drawing.

In applying regenerative gas-furnaces, such as are described in the specification of certain Letters Patent granted in Great Britain to me and Frederick Siemens, and dated January 22, 1861, to certain chemical and metallurgical operations, such as calcining and smelting of copper, lead, or ores, puddling iron, and other purposes, it is requisite to arrange the regenerators in a more accessible manner than that represented in such specification and the drawing appertaining thereto, in order that such regenerators may be readily cleared from the dust and other matters carried therein with the hot gaseous products of combustion.

For this purpose, instead of constructing or arranging the regenerators in vertical positions and closely side by side, and extended to a considerable depth below the furnace, I now arrange them horizontally beneath the furnace, extending them in some cases partially beyond it, and with the two regenerators of each pair arranged one above the other. By preference I place the gas-regenerators uppermost, and the two pairs so arranged may have one or more passages at their outer sides and ends, whereby to render them readily accessible for clearing them, when required, of deposits made from time to time within them. To this end the side or end walls of the regenerators may be provided with apertures having proper doors or other means for being closed, such apertures being for the introduction of tools for clearing the regenerators of such deposits. In other cases the regenerators may be so arranged or constructed as to be readily cleaned or refilled from their tops. Apertures may also be made in the roof of the furnace and over the vertical passages leading from the regenerators into the furnace, such apertures being provided with suitable means for closing them, and being to facilitate the gaining of access to the regenerators for removing deposits therefrom.

This horizontal arrangement of regenerators and furnace has the further advantage of requiring comparatively little depth for the regenerators below the ground-line of the furnace.

Each pair of regenerators may be made to communicate with opposite ends of the furnace; but, in cases where it may be desirable to make the furnace-bed accessible from three sides of it, as, for instance, in copper and lead-smelting furnaces and puddling furnaces, I arrange both pairs of regenerators to communicate with one and the same end or side of the furnace. In this case the ascending gas and air-passages to each pair of the regenerators, I usually cause, just before entering the furnace, to unite in a small mixing-chamber, in which chamber the mixing and ignition of the gases take place, whereby, owing to the confined space of the chamber, preventing expansion of the gases therein, they will be expelled in a jet through a tapering aperture leading from the chamber into the furnace, and will pass across the bed, and, in returning, will escape through an aperture conducting to the other pair of the regenerators.

Figures 1 to 4 show the above-described improved arrangement as applied to a copper-refining furnace.

Fig. 1 is a longitudinal and vertical section of the furnace and one pair of regenerators, such section being taken on the line X X of fig. 3.

Fig. 2 denotes a transverse and vertical section, taken on the line Z Z of fig. 1.

Fig. 3 exhibits a horizontal sectional plan or view of the refining-hearth, as taken on the line Y Y of fig. 1.

Fig. 4 shows a horizontal sectional plan of the regenerators, it being taken on the line W W of fig. 1.

Similar letters of reference indicate in each of the figures similar parts.

A A A' A' are the regenerators arranged horizontally beneath the refining-furnace C, A A being the regenerators for heating the air, and A' A' those for heating the gas.

The regenerators are composed of fire-brick pillars, so arranged as to break up the current passing through them into minute divisions, but the arrangement may be varied according to circumstances; and another mode of filling the regenerators is shown at Figure 5.

Both pairs of regenerators communicate with one and the same end of the furnace by means of passages B B B' B', arranged as represented. The gas and air from one pair of regenerators in rising through these passages enter one of the pair of spaces D D, (see fig. 1,) the air being above the gas. In such space the gas will be ignited and the flame will pass from thence into and through the tapering passage E and into the furnace C. After having traversed the hearth or through the furnace the flames and and hot gases will return and escape through the other passages E' and B B' to the other pair of regenerators.

The passages B B' are accessible through man-holes F built up, such holes being to facilitate the clearing of the passages from dust or deposits.

The regenerators may also be cleared of dust by removing a portion of the brick-work coverings at G G, and brushing or scraping off the deposit which falls into the transverse spaces at the bottom, which are made sufficiently large to take the deposits from several clearings, and which are emptied when the regenerators are reset.

The metal on the hearth C is worked from the aperture H in the usual manner.

The furnace-bed may be constructed of iron plates, and in puddling-furnaces, having around them boxes or troughs through which cold water may be made to circulate in the usual manner, the cold water entering the same through a pipe may be arranged to pass backward and forward beneath the floor-plates in front of the working hole to keep them cool.

The bottom of the furnace-bed may also be kept cool by the evaporation of water from a tank, in a similar manner to that described in the specification to my British Patent No. 2,413, of 1866, ventilating passages, M M, being provided at the back of the furnace to carry off the steam. The water may be supplied to the tank by the overflow from the edges of the trough and may flow therefrom through a waste-pipe.

The reversing and regulating valves to the air and gas-regenerators are not shown in the plans.

I herein make no claim to the combination of a furnace with one or more regenerators or means of receiving its waste gaseous products, and intercepting or receiving heat therefrom, and also with means or devices by which all or a portion of the heat so intercepted or received may be absorbed by the influent air or gas during its passage into or to such furnace for the purpose of improving combustion therein, such being the principle of the invention of myself and Frederick Siemens, as shown in the United States Patent No. 41,788, reissued January 12, 1869.

What I do claim as my present invention is—

The arrangement of the furnace C and regenerators A A A' A', and their connection-passages B B B' B', and air and gas-mixing chambers D D E E, substantially as hereinbefore explained, and as represented in the accompanying drawing.

C. WILLIAM SIEMENS.

Witnesses:
 ROBT. LINKSOM,
 AND. BRAUMANN.
  Both of 2 Pope's Head Alley,
   Cornhill, London.